INVENTORS
FRANCIS M. ROGALLO
RODGER L. NAESETH

ATTORNEYS

INVENTORS
FRANCIS M. ROGALLO
RODGER L. NAESETH

United States Patent Office 3,443,779
Patented May 13, 1969

3,443,779
AEROFLEXIBLE STRUCTURES
Francis M. Rogallo, Newport News, and Rodger L. Naeseth, Hampton, Va., assignors to the United States of America as represented by the Administrator of National Aeronautics and Space Administration
Filed Nov. 16, 1967, Ser. No. 683,612
Int. Cl. B64d 1/02, 17/00, 19/00
U.S. Cl. 244—138       10 Claims

ABSTRACT OF THE DISCLOSURE

A new configuration for inflating the stiffeners of flexible wings with ram-air during flight comprising ram-air inlets located away from the forward stagnation area of the wing, with associated ram-air deflectors supported by the wing at points substantially aft of the forward stagnation area.

---

The invention described herein was made by employees of the United States Government and may be manufactured and used by or for the Government for governmental purposes without the payment of any royalties thereon or therefor.

This invention relates generally to the field of flexible wings and more particularly to inflating the stiffeners of such wings.

Flexible wings are most advantageously used when they can be folded up and packed as parachutes, and then deployed when needed. In contrast, flexible wings under certain circumstances, give better aerodynamic performance when they contain some rigid members, so inflatable stiffeners are often incorporated into the wings. Since the advent of flexible wings no adequate method for inflating the stiffeners has been found. Pressure bottles add weight and complexity to the overall system and tend to get in the way during wing deployment. Ram-air inflation during flight has been advocated as a means of overcoming the disadvantages of pressure bottles and experiments have proven this method feasible; however, attempts to inflate the stiffeners using ram-air have been accompanied by difficulties. Because ram-air inlets interrupt the streamlined contour of the wing they create a drag which must be supported by the wing. Previous ram-air inlets have been located at the front, or forward stagnation area, of the wing to take advantage of the high ram pressure at that point. This creates several adverse effects on a flexible wing. At low angles of attack the drag at the forward stagnation area pushes straight back or down. Since the flexible material offers no support in compression or bending this tends to make the wing collapse or fold under. Such distortion of wing shape leads to more drag and the effect snowballs. Also, a drag force acting at the front of an aircraft is inclined to cause instability.

This invention overcomes the above mentioned difficulties by locating ram-air inlets away from the forward stagnation area, and providing sufficient inlet pressure by use of deflectors supported by the wing at points substantially aft of the forward stagnation area of the wing. The drag of the deflectors can then be supported by the flexible material with a minimum of distortion and the drag acting on the wing nearer the rear has the same stabilizing effect as a tail on a kite.

One object of this invention is to provide an improved configuration for inflating the stiffeners of flexible wings with ram-air.

Another object of this invention is to provide a configuration for inflating the stiffeners of flexible wings with ram-air through ram-air inlets located away from the forward stagnation area of the wing.

A further object of this invention is to provide ram-air deflectors on flexible wings for directing air into the ram-air inlets, but which create a minimum of drag and a maximum of stability.

Still another object of this invention is to provide several modifications of flexible wings with ram-air inlets located away from the forward stagnation point and ram-air deflectors supported substantially aft of the forward stagnation point.

Further and additional objects of the invention will become obvious from a consideration of this specification, the accompanying drawings and the appended claims.

For a more complete understanding of this invention reference will now be made to the accompanying drawings wherein.

Figure 1:
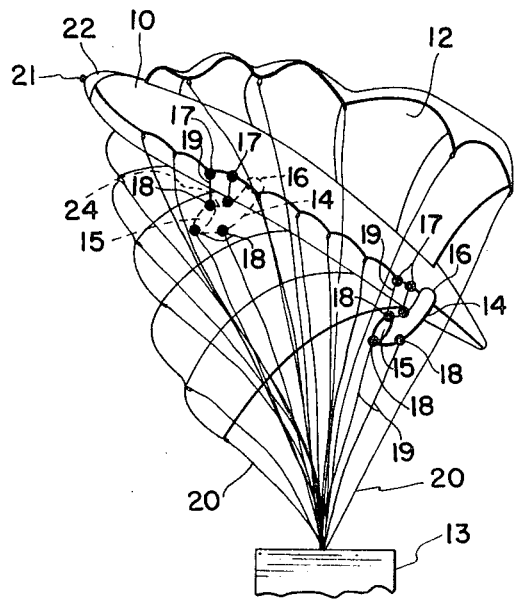
FIG. 1 is a perspective view of one embodiment of an aft supported ram-air deflector as used to inflate the keel stiffener of a triangular shaped flexible wing.
Figure 3:
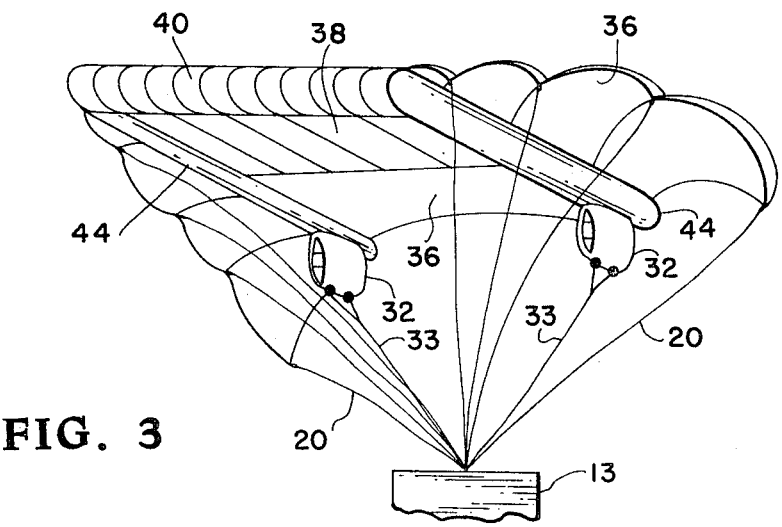
FIG. 3 is a perspective view of the fin ram-air deflector embodiment, as in FIG. 2, as used to inflate the stiffeners of a double keel flexible wing configuration.

Referring now to the drawings wherein like reference numerals designate identical or corresponding parts throughout the several views, and more particularly to FIG. 1, a triangular flexible wing is shown with a ram inflatable keel stiffener 10, flexible wing material 12, and shroud lines 20. The forward stagnation point 21 of this wing is located at the forward end of the stiffener 10, but the actual position of this point varies over a small area 22 (forward stagnation area) as the wing oscillates in roll and yaw. This area is covered by a streamlined nose fairing. Located and supported substantially aft of the forward stagnation area 22 is the ram-air inlet 16 with its associated ram-air deflector composed of a ram-air scoop 15 and a ram-air duct 14 to direct the air into the stiffener 10 through the ram-air inlet 16. The scoop and duct are held in position by one or more brace lines 19 at points 18 and is fabricated of cloth with a rigidity suitable for giving the scoop 15 the proper shape before it is held open by ram-air pressure. The brace lines supporting the scoop and duct are connected to the wing at points 17, which are substantially aft of the forward stagnation area 22, and extend down to the payload 13 supported by the shroud lines 20. Numeral 24 designates an alternate position for the deflector, which is still supported substantially aft of the forward stagnation area 22. Although only two locations are shown in FIG. 3, the deflector could assume any location on the keel 10 that is substantially aft of the forward stagnation area. It is to be understood that the deflector could be on a leading edge stiffener (not shown) as well as the keel stiffener 10 so long as it is supported substantially aft of the forward stagnation area.

Figure 2:
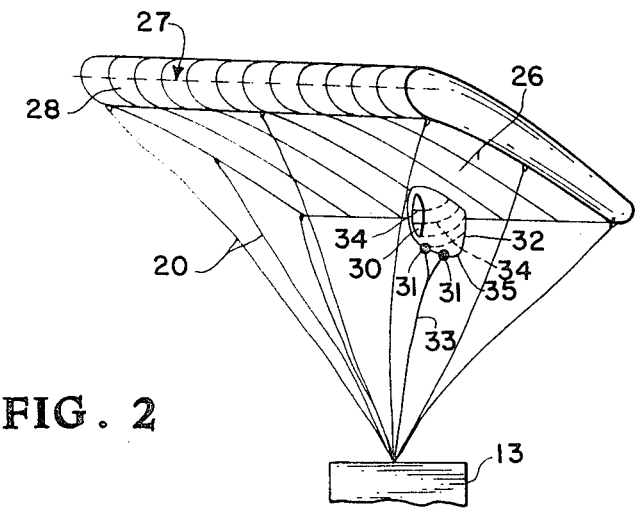
FIG. 2 is a perspective view of a fin embodiment of an aft supported ram-air deflector as used to inflate a rectangular ram-air wing.

FIG. 2 shows a ram-air rectangular wing made up of parallel adjacent inflatable stiffeners 26 which are interconnected so that air circulates among them. Shroud lines 20 are attached to various points on the wing and to a payload 13. The infinite number of forward stagnation points of this wing form a line 27 running along the leading edge of the wing, the actual location of which varies over a small area 28 (forward stagnation area) as the wing oscillates in roll. This area is covered by a streamlined fairing. Located and supported substantially aft of the forward stagnation area 28 is a fin shaped ram-air scoop 32 to direct air into the stiffeners 26. The scoop 32 is held in position by one or more brace lines 33 attached to the scoop at points 31 and is fabricated of cloth with a stiffness suitable for giving the opening 30 the proper shape before the scoop is distended by ram pressure. The brace lines extend down to the payload 13 supported by the shroud lines. Internal cloth tie strips 34 reinforce the sides of the scoop preventing them from puffing out and help direct the air into the stiffeners 26. The tie strips 34 can be seen as solid lines through the opening 30 but as dotted lines otherwise. The pressure from the ram-air sustains the fin 32 in its proper aerodynamic shape, including the rear portion 35. It is to be understood that, in this flexible wing embodiment, there could be more than one fin ram-air scoop, however, the fins must be geometrically spaced about the center line so that the drag will not create instability. It is to be further understood that ram-air fin scoop 32 could be located further forward than that shown in FIG. 2 as long as it is substantially aft of the forward stagnation area 28.

FIG. 3 shows a configuration which combines a ram-air rectangular wing 38, as in FIG. 2, with a double keel triangular wing having flexible wing material 36 and shroud lines 20. The keels 44 are interconnected with the ram-air rectangular wing 38, so that air circulates between them, and the whole system is inflated by fin ram-air scoops 32 which are located and supported substantially aft of the forward stagnation area 40. The fin ram-air scoops 32 could be located at points on the keels 44 forward of those shown in FIG. 3 as long as it is substantially aft of the forward stagnation area 40. Again, the forward stagnation area is covered with a streamlined fairing.

Figure 4:
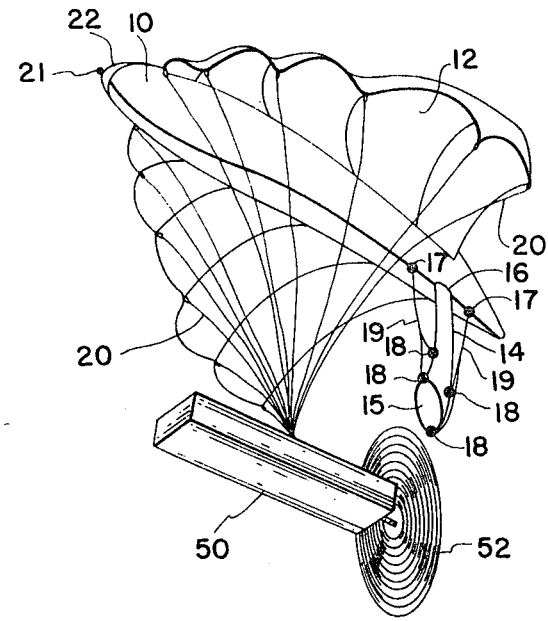
FIG. 4 is the same view as FIG. 1 but a motor driven propeller has been added.

In FIG. 4 a propeller 52, driven by motor 50, is suspended by lines 54 from the same triangular flexible wing shown in FIG. 1. The propeller 52 is positioned so that it creates an airstream directed aft into the ram-air scoop 15; thus, the wing is inflated by flow from the propeller as well as the normal airstream.

*Operation*

The invention is shown in its simplest form in FIG. 1 where a ram-air inlet 16 is located substantially aft of the forward stagnation area 22 on the keel 10. When the wing is deployed the ram-air scoop 15 and duct 14 are drawn away from the keel 10 by one or more brace lines 19 attached to the scoop and duct at points 18 and the scoop 15 is held exposed to the airstream by the stiffness in the material. As the wing flies forward the airstream creates pressure at the mouth of the scoop 15, thus, inflating the stiffener 10. Because the ram-air scoop 15 and duct 14 interrupt the contour of the wing they create drag which is translated to the keel by the brace lines 19 at points 17. This force is countered by the lift pressure on the wing at points 17 and the keel 10 forward of point 17 in tension. This drag acting at the rear of the wing tends to stabilize it in the same manner as a kite is stabilized by its tail.

When the ram-air deflector is located at an alternate position such as 24 it would still be supported by the keel 10 but there would be very little stabilizing effect because the drag would be supported approximately in the middle of the wing. The closer the deflector is moved to the forward stagnation area 22 the more unstable the wing becomes and the less lift pressure, and keel in tension, there is to support the drag. If the deflector were at the forward stagnation area 22, or if there were simply a ram-air inlet at that point, then it would have to depend on the keel in compression or bending for support particularly at low angles of attack.

The operation of the fin ram-air scoop 32, FIG. 2, is much the same as for the circular scoop 15 in that it is drawn away from the wing by one or more brace lines 33 attached to the ram-air scoop at points 31 and the opening 30 is held exposed to the airstream by the stiffness of the scoop material. The brace lines extend down to the payload 13 which is supported by the shroud lines 20. The purpose of the fin shape is to reduce the drag. Internal cloth tie strips 34 are provided to prevent the sides of the fin ram-air scoop 32 from puffing out. The fin ram-air scoop 32 holds its shape due to the ram pressure at the opening 30 pushing against the internal tie strips 34. The drag of the scoop is translated to the wing at the points where the scoop is attached to the wing. The forward stagnation area 28 of the rectangular ram-air wing shown in FIG. 2 runs along its leading edge and the fin ram-air scoop 32 is substantially aft of this area.

The wing configuration shown in FIG. 3 is designed with many inflatable stiffeners to take advantage of the unlimited supply of pressurized air provided by ram-air. The aerodynamic performance of the double keel flexible wing is improved by adding the ram-air rectangular wing 38 as a stiffener to separate the keels at the forward stagnation area 40. In accordance with this invention the fin ram-air scoops 32 are located and supported substantially aft of the forward stagnation area 40.

In FIG. 4 the purpose of the propeller 52 driven by the motor 50 is twofold: It propels the flexible wing forward at a greater speed and it increases the pressure at the ram-air scoop 15 thus, making the keel stiffener 10 harder. This takes advantage of the ram-air deflector being supported substantially aft of the forward stagnation area 22 because such a configuration would be difficult if it were supported too far forward. It should be understood that flow from other types of propulsion devices could be utilized for inflation.

What is claimed is:
1. A flexible wing structure comprising:
   a flexible wing capable of transporting a payload hanging under it;
   said flexible wing having inflatable stiffener means imparting structural rigidity to said wing;
   ram-air inlet means formed in said inflatable stiffener located away from the forward stagnation area of the wing so as to effect greater structural and aerodynamic stability in said wing;
   deflector means depending from said flexible wing for directing the airstream into said inlet means;
   said deflector means having an opening facing toward the front of the wing; and
   support means for supporting said deflector means on said wing substantially aft of the forward stagnation area of the wing so as to minimize distortion of the wing shape.

2. A flexible wing structure as embodied in claim 1 wherein said deflector consists of:
   a ram-air scoop, said scoop being formed of a flexible material having sufficient rigidity to hold the scoop open; and
   a ram-air scoop with one said ram-air inlet.

3. A flexible wing structure as embodied in claim 2 wherein said support means consists of at least one brace line attached to said deflector and extended between the payload and the wing, each of said brace lines being attached to said wing substantially aft of the forward stagnation point.

4. A flexible wing structure as embodied in claim 1 wherein:
   said ram-air inlet means is located substantially aft of the forward stagnation area;
   said deflector means consists of a ram-air scoop, said scoop being formed of a flexible material having sufficient rigidity to hold the scoop open; and
   said support means consists of attaching said scoop directly to said stiffener.

5. A flexible wing structure as embodied in claim 4 wherein said scoop consists of:
   a hollow fin covering said inlet and running lengthwise with the airstream so as to cause minimum drag;
   flexible cloth tie strips connected between the sides of said scoop to keep it from puffing out and positioned to direct the airstream into said inlet; and
   extending means for extending said scoop away from the wing.

6. A flexible wing structure as embodied in claim 5 with said extending means consisting of at least one brace line connected between the payload and each said hollow fin.

7. A flexible wing structure as embodied in claim 1 wherein said wing is triangular in shape and has an inflatable keel as a stiffener.

8. A flexible wing structure as embodied in claim 1 wherein said wing is essentially rectangular in shape and is composed of parallel adjacent inflatable stiffeners, all of said stiffeners being interconnected so that air circulates among them.

9. A flexible wing structure as embodied in claim 1 wherein:

said flexible wing has two inflatable keel stiffeners being separated at the forward edge by shorter parallel adjacent inflatable stiffeners, all of said inflatable stiffeners being interconnected so that air circulates among them; and ram-air inlet means located on each keel.

10. A flexible wing structure as embodied in claim 1 wherein also included are:

propulsion means causing an airstream to be directed aft into said deflectors; and means for supporting said propulsion means.

References Cited

UNITED STATES PATENTS

| | | | |
|---|---|---|---|
| 2,529,966 | 11/1950 | Rozas | 244—138 |
| 3,104,857 | 9/1963 | Knacke et al. | 244—145 |
| 3,131,894 | 5/1964 | Jalbert | 244—145 |
| 3,285,546 | 11/1966 | Jalbert | 244—145 |

MILTON BUCHLER, *Primary Examiner.*

RICHARD A. DORNON, *Assistant Examiner.*

U.S. Cl. X.R.

108—28; 248—361